US012024638B2

(12) United States Patent
Ala et al.

(10) Patent No.: US 12,024,638 B2
(45) Date of Patent: Jul. 2, 2024

(54) BLEND OF POLYACRYLIC AND POLYVINYL ACETATE LATEXES

(71) Applicants: Rohm and Haas Company, Collegeville, PA (US); Dow Global Technologies LLC, Midland, MI (US)

(72) Inventors: Azize Ala, East Norriton, PA (US); Gary W. Dombrowski, Chester Springs, PA (US); Catheryn L. Jackson, Lansdale, PA (US); Partha S. Majumdar, Harleysville, PA (US); Teresa A. Phillips, Westhampton, NJ (US); Sharon M. Vuong, Downingtown, PA (US); Steven G. Arturo, Bala Cynwyd, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 53 days.

(21) Appl. No.: 17/630,740

(22) PCT Filed: Aug. 4, 2020

(86) PCT No.: PCT/US2020/044818
§ 371 (c)(1),
(2) Date: Jan. 27, 2022

(87) PCT Pub. No.: WO2021/030095
PCT Pub. Date: Feb. 18, 2021

(65) Prior Publication Data
US 2022/0275238 A1 Sep. 1, 2022

Related U.S. Application Data

(60) Provisional application No. 62/884,828, filed on Aug. 9, 2019.

(51) Int. Cl.
C09D 131/04 (2006.01)
C08F 220/18 (2006.01)
C09D 133/08 (2006.01)

(52) U.S. Cl.
CPC ...... *C09D 131/04* (2013.01); *C08F 220/1802* (2020.02); *C09D 133/08* (2013.01)

(58) Field of Classification Search
CPC .................................................. C09D 131/04
See application file for complete search history.

(56) References Cited

U.S. PATENT DOCUMENTS

| 5,171,777 | A | 12/1992 | Kuphal et al. |
| 6,174,960 | B1 | 1/2001 | Phan et al. |
| 6,451,899 | B1 | 9/2002 | Zhao et al. |
| 7,179,531 | B2 * | 2/2007 | Brown ...... B32B 5/16 |
| | | | 428/407 |
| 7,531,032 | B2 | 5/2009 | Cordova |
| 8,580,873 | B2 | 11/2013 | Hyman et al. |
| 2018/0072909 | A1 * | 3/2018 | Zhou ............. C09D 113/02 |
| | | | 113/2 |

FOREIGN PATENT DOCUMENTS

| EP | 2853570 A1 | 4/2015 | |
| WO | 2012082141 A1 | 6/2012 | |
| WO | WO2014113411 | * 7/2014 | ........... C09D 143/02 |

* cited by examiner

*Primary Examiner* — Catherine S Branch
*Assistant Examiner* — Huihong Qiao
(74) *Attorney, Agent, or Firm* — Reid S. Willis

(57) ABSTRACT

The present invention is a composition comprising a blend of a PVA based latex and an EA/MMA based polyacrylic latex. The composition of the present invention is useful in a paint formulation for providing a coating with superior scrub resistance over a formulation comprising a blend of a PVA based latex and a BA/MMA based polyacrylic latex.

16 Claims, No Drawings

BLEND OF POLYACRYLIC AND POLYVINYL ACETATE LATEXES

BACKGROUND OF THE INVENTION

The present invention relates to a blend of a polyacrylic based latex and a poly(vinyl acetate) based latex.

Blending compositionally distinct latexes is practiced to target a better balance of properties in waterborne architectural paint formulations compared with formulations containing compositionally uniform latexes. Unfortunately, mixing chemically incompatible latexes decreases miscibility resulting in an unacceptable degradation of one or more desirable properties.

Poly(vinyl acetate) (PVA) latex based paints often give coatings with superior scrub performance as compared with polyacrylic latex based paints. Although PVA latexes are also cost advantaged over polyacrylic latexes, coatings made from PVA latex based paints suffer from a number of inferior properties provided by polyacrylic based paints including adhesion and stain resistance of the consequent coating. Attempts to achieve the property benefits and cost advantages of both classes of latexes by combining PVA and polyacrylic latexes into a single paint formulation have resulted in unacceptable reduction in scrub resistance. Accordingly, it would be advantageous to design latexes more economically with property advantages of both PVA and polyacrylic based latexes.

BACKGROUND OF THE INVENTION

The present invention addresses a need in the art by providing a composition comprising an aqueous dispersion of first polymer particles and second polymer particles, wherein the first polymer particles comprise from 60 to 99.8 weight percent structural units of vinyl acetate, based on the weight of the first polymer particles, and the second polymer particles comprise at least 80 weight percent, based on the weight of the second polymer particles, of structural units of ethyl acrylate and methyl methacrylate, wherein the weight-to-weight ratio of structural units of ethyl acrylate to methyl methacrylate in the second polymer particles is in the range of from 50:50 to 95:5; and wherein the weight-to-weight ratio of the first polymer particles to the second polymer particles is in the range of from 30:70 to 90:10. The composition of the present invention provides a mixture of latexes useful in a paint composition for providing a coating with improved scrub resistance.

DETAILED DESCRIPTION OF THE INVENTION

The present invention is a composition comprising an aqueous dispersion of first polymer particles and second polymer particles, wherein the first polymer particles comprise from 60 to 99.8 weight percent structural units of vinyl acetate, based on the weight of the first polymer particles, and the second polymer particles comprise at least 80 weight percent, based on the weight of the second polymer particles, of structural units of ethyl acrylate and methyl methacrylate, wherein the weight-to-weight ratio of structural units of ethyl acrylate to methyl methacrylate in the second polymer particles is in the range of from 50:50 to 95:5; and wherein the weight-to-weight ratio of the first polymer particles to the second polymer particles is in the range of from 30:70 to 90:10.

The first polymer particles preferably have a volume average particle size, as measured by dynamic light scattering, in the range of from 150 nm, preferably from 250 nm, to 400 nm. The first polymer particles preferably comprise from 60 to 95 weight percent structural units of vinyl acetate (VA), and preferably further comprise from 5, more preferably from 10, more preferably from 15, most preferably from 25 to preferably 40, more preferably to 38 weight percent, based on the weight of the first polymer particles, structural units of an alkyl acrylate such as ethyl acrylate (EA, $T_g=-22°$ C.), butyl acrylate (BA, $T_g=-54°$ C.), 2-ethylhexyl acrylate (2-EHA, $T_g=-85°$ C.), or structural units of ethylene or vinyl versatate.

As used herein, the term "structural unit" of a named monomer refers to the remnant of the monomer after polymerization. For example, a structural unit of methyl methacrylate (MMA) is as illustrated:

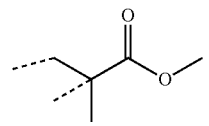

structural unit of methyl methacrylate where the dotted lines represent the points of attachment of the structural unit to the polymer backbone.

The first polymer particles further preferably comprise from 0.2 to 5, more preferably to 2 weight percent structural units of an acid monomer such as a carboxylic acid monomer, a phosphorus acid monomer, or a sulfur acid monomer. Suitable carboxylic acid monomers include acrylic acid (AA), methacrylic acid (MAA), and itaconic acid (IA), and salts thereof.

Suitable phosphorus acid monomers including phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates. Other suitable phosphorus acid monomers include polymerizable ethoxylated phosphates represented by the following structure:

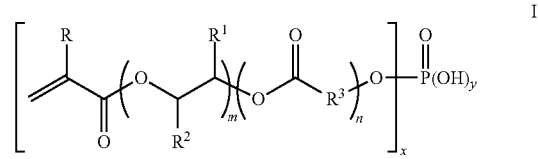

and salts thereof, wherein R is H or $CH_3$, wherein $R^1$ and $R^2$ are each independently H or $CH_3$, with the proviso that no two adjacent $CR^2CR^1$ groups are each substituted with methyl groups; each $R^3$ is independently linear or branched $C_2$-$C_6$ alkylene; m is from 1 to 10; n is from 0 to 5 with the proviso that when m is 1, n is 1 to 5; x is 1 or 2; and y is 1 or 2; and x+y=3. When n is 0, x is 1, and y is 2, the polymerizable organic phosphate or salt thereof is represented by the structure of Formula II:

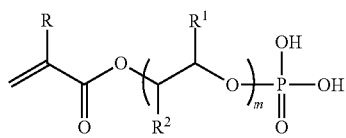

Sipomer PAM-100, Sipomer PAM-200 and Sipomer PAM-600 phosphate esters are examples of commercially available compounds within the scope of the compound of Formula II.

Examples of suitable sulfur acid monomers include sulfoethyl methacrylate, sulfopropyl methacrylate, styrene sulfonic acid, vinyl sulfonic acid, and 2-acrylamido-2-methyl propanesulfonic acid (AMPS), and salts thereof.

The second polymer particles preferably have a volume average particle size, as measured by dynamic light scattering, in the range of from 70 nm, more preferably from 80 nm, to 300 nm, more preferably to 250 nm, more preferably to 200 nm, and most preferably to 150 nm. The ratio of EA to MMA is preferably adjusted to produce polymer particles having a $T_g$, as calculated by the Fox equation, in the range of from $-10°$ C., preferably from $0°$ C., to $30°$ C., more preferably to $25°$ C., and most preferably to $20°$ C. Preferably, the weight-to-weight ratio of EA to MMA in the second polymer particles is in the range of from 60:40, more preferably from 65:45, to 90:10, more preferably to 85:15, and most preferably to 80:20.

The second polymer particles preferably comprise from 0.1 to 3 weight percent structural units of an acid monomer, including the carboxylic acid monomers, phosphorus acid monomers, and sulfur acid monomers, and salts thereof, as described hereinabove. The second polymer particles advantageously include structural units of MAA and/or PEM and salts thereof. The total concentration of structural units of acid monomer or monomers in the second polymer particles is preferably in the range of from 0.2 to 2 weight percent, based on the weight of the second polymer particles.

The second polymer particles preferably comprise at least 90, more preferably at least 95, and most preferably at least 98.1 weight percent structural units of EA and MMA, based on the weight of the second polymer particles. The second polymer particles comprise less than 20 weight percent structural units of other ancillary monomers such as BA and acrylonitrile (AN). Preferably, the second polymer particles comprise less than 1.9 weight percent, more preferably less than 1 weight percent, and most preferably 0 weight percent structural units of AN, based on the weight of the second polymer particles; and preferably less than 10, more preferably less than 5 weight percent structural units of BA, based on the weight of the second polymer particles.

The composition of the present invention is useful as binders for a paint formulation, especially a paint formulation for architectural coating applications having a pigment volume concentration preferably in the range of from 20%, more preferably from 40%, to 70%, more preferably to 60%. Accordingly, in another aspect, the present invention comprises a latex paint composition comprising the polyacrylic and PVA latexes of the present composition and a dispersant, a surfactant, a defoamer, a neutralizer, a pigment, an extender, a coalescent, and a rheology modifier. The paint composition may also include opaque polymers and a biocide. It has been surprisingly discovered that replacing BA with EA in the second polymer particles (corresponding to the polyacrylic based latex) consistently gives coatings with improved scrub resistance without diminishing other properties imparted by the polyacrylic based latex.

EXAMPLES

In the following examples, latex particle sizes (PS) were measured with a Brookhaven BI-90 Particle Size Analyzer Intermediate Example 1—Preparation of Acrylic Latex Functionalized with EA, MMA, and MAA A monomer emulsion was prepared using deionized water (800 g), Polystep B-5-N emulsifier (16.6 g) EA (1142 g), glacial MAA (19.5 g), and MMA (774 g). Deionized water (676 g) was added to a 5-L, 4-neck flask equipped with mechanical stirring, a thermocouple, a reflux condenser, an $N_2$ inlet, and inlets for monomer emulsion (ME) and initiator solution. The water was stirred and heated to $87°$ C., at which temperature a solution consisting of deionized water (12 g) and Polystep B-5-N emulsifier (19.7 g) was added to the flask followed by a solution of $Na_2CO_3$ (6.8 g) in deionized water (67.1 g). A portion of the ME (58.8 g) was then added to the flask, followed by an initiator solution of deionized water (17 g) and ammonium persulfate (APS, 6.8 g).

After about 5 min, the remainder of the ME, along with a solution of deionized water (91.5 g) and APS (1.0 g) were fed into the reactor over 80 min, with the reactor temperature controlled controlled at $88°$ C. The ME and APS solutions were fed at rates of 23.9 g/min and 0.81 g/min, respectively, for 10 min, after which time the ME feed rate was increased to 35.9 g/min and the APS solution feed rate was increased to 1.22 g/min over the remaining 70 min. After 43 min from the beginning of the ME feeds, a solution of N-(2-methacryloxyethyl) ethylene urea (19.6 g) in deionized water (19.6 g) was added to the ME followed by a rinse.

After completion of the feeds, the reactor was cooled to $75°$ C., whereupon a solution of ferrous sulfate heptahydrate (0.02 g) and VERSENE™ 220 Chelating Agent (A Trademark of Dow, Inc. or Its Affiliates, 0.02 g) in deionized water (15.4 g) was added to the flask. A solution of t-butylhydroperoxide (t-BHP, 1.4 g, 70% active) in deionized water (17.7 g), and a separate solution of isoascorbic acid (IAA, 0.74 g) in deionized water (18.3 g) were fed to the reactor over 20 min at $75°$ C. After completion of feed addition, the reaction mixture was cooled to $30°$ C. and neutralized to pH 8.5 with ammonium hydroxide solution (12.5 g, 28% aq.).

A solution of Kathon; LX 1400 Preservative (1.36 g) and VERSENE™ 220 Chelating Agent (0.46 g) in deionized water (24.4 g) was added to the flask. The resulting latex was filtered to remove coagulum. The measured solids content of the resulting latex was 50.4%; PS was 120 nm.

Intermediate Example 2—Preparation of Acrylic Latex Functionalized with EA, MMA, and MAA The procedure was carried out essentially as described for Intermediate Example 1, except an additional solution of t-amylhydroperoxide (t-AHP, 1.45 g, 85% active) and Polystep B-5-N emulsifier (0.2 g) in deionized water (18.1 g), and a separate solution of IAA (1.1 g) in deionized water (26.6 g) were fed into the flask over 20 min at $75°$ C. The measured solids for the resulting latex was 50.0% and the PS was 122 nm.

Intermediate Example 3—Preparation of Acrylic Latex Functionalized with EA, MMA, and MAA An ME was prepared deionized water (800 g), Polystep B-5-N emulsifier (33.2 g), EA (1347 g), glacial MAA (19.5 g), and MMA (569 g). Deionized water (1000 g) was added to a 5-L, 4-neck flask equipped with mechanical stirring, a thermocouple, a reflux condenser, an $N_2$ inlet, and inlets for monomer emulsion (ME) and initiator solution. The water was stirred and heated to 87° C., at which temperature a solution consisting of deionized water (12 g) and Polystep B-5-N emulsifier (39.5 g) was added to the flask followed by a solution of $Na_2CO_3$ (6.8 g) in deionized water (67.1 g). A portion of the ME (58.8 g) was then added to the flask, followed by an initiator solution of deionized water (17 g) and ammonium persulfate (APS, 6.8 g).

After about 5 min, the remainder of the ME, along with a solution of deionized water (91.5 g) and APS (1.0 g) were fed into the reactor over 120 min, with the reactor temperature controlled at 88° C. The ME and APS solutions were fed at rates of 12.0 g/min and 0.41 g/min, respectively, for 10 min, after which time the ME feed rate was increased to 18.0 g/min and the APS solution feed rate was increased to 0.61 g/min After another 10 min, the ME feed rate was increased to 25.2 g/min and the initiator solution was increased to 0.81 g/min for the remaining 100 min of the polymerization. After 74 min from the beginning of the ME feeds, a solution of N-(2-methacryloxyethyl) ethylene urea (19.6 g) in deionized water (19.6 g) was added to the ME followed by a rinse.

After completion of the feeds, the reactor was cooled to 75° C., whereupon a solution of ferrous sulfate heptahydrate (0.02 g) and VERSENE™ 220 Chelating Agent (0.02 g) in deionized water (15.4 g) was added to the flask. A solution of t-BHP (1.4 g, 70% active) in deionized water (17.7 g), and a separate solution of IAA (0.74 g) in deionized water (18.3 g) were fed to the reactor over 20 min at 75° C.

After completion of feed addition, a solution of t-AHP (1.45 g) and Polystep B-5-N emulsifier (0.02 g) in deionized water (18.1 g), and a separate solution of IAA (1.1 g) in deionized water (26.6 g) were fed into the reactor over 20 min at 75° C., and the reaction mixture was cooled to 30° C. and neutralized to pH 8.5 with ammonium hydroxide solution (12.0 g, 28% aq.).

A solution of Kathon LX 1400 Preservative (1.36 g) and VERSENE™ 220 Chelating Agent (0.46 g) in deionized water (24.4 g) was added to the flask. The resulting latex was filtered to remove coagulum. The measured solids content of the resulting latex was 46.4%; PS was 84 nm.

Intermediate Example 4—Preparation of Low Particle Size Acrylic Latex Functionalized with EA, MMA, PEM, and MAA The procedure was carried out essentially as described for Intermediate Example 3, except that the ME was prepared deionized water (800 g), Polystep B-5-N emulsifier (33.2 g), EA (1325.5 g), glacial MAA (9.8 g), PEM (18.8 g, 60% active), and MMA (568.9.1 g). The measured solids for the resulting latex was 46.0%; PS was 83 nm.

The commercial acrylic latex RHOPLEX™ SG-10AF Acrylic Binder, which is a BA/MMA/MAA latex at a w/w/w ratio of 46/52/1 and a solids content of 50%, was used for Comparative Intermediate Example 1. Comparative Example Paints 1, 2, and 3 were prepared with this intermediate.

Comparative Intermediate Example 2—Preparation of Small Particle Size Acrylic Latex Functionalized with BA, MMA, and MAA The procedure was carried out essentially as described for Intermediate Example 3, except that the ME was prepared deionized water (800 g), Polystep B-5-N emulsifier (30.0 g) BA (1051.8 g), glacial MAA (19.5 g), and MMA (864.1 g); and the surfactant solution consisted of deionized water (12 g) and Polystep B-5-N emulsifier (42.6 g). The measured solids for the resulting latex was 46.4%; PS was 84 nm.

Comparative Intermediate Example 3—Preparation of Low Particle Size Acrylic Latex Functionalized with BA, MMA, PEM, and MAA The procedure was carried out essentially as described for Intermediate Example 3, except that the ME was prepared deionized water (800 g), Polystep B-5-N emulsifier (30.0 g), BA (1030.3 g), glacial MAA (18.8 g), PEM (18.8 g, 60% active), and MMA (864.1.1 g); and the surfactant solution consisted of deionized water (12 g) and Polystep B-5-N emulsifier (42.6 g). The measured solids for the resulting latex was 46.4%. The measured solids for the resulting latex was 46.1%; PS was 85 nm.

Preparation of Paints

The polymers were formulated into white base paints at 27.5 PVC and 50 PVC. PVC is defined by the following formula:

$$PVC = \left[\frac{Vol\ \text{Pigment} + \text{Extender}}{Vol\ \text{Pigment} + \text{Extender} + \text{Binder Solids}}\right] \times 100$$

where binder solids refers to the contribution of polymer from the aqueous dispersion of the polymer particles that bind the pigment and extender particles together.

Table 1 outlines the ingredients and their levels in formulations Comparative Example 1 and Comparative Example 2, both of which are formulated using the acrylic latex prepared as described in Comparative Intermediate Example 1 and a commercial VA latex, ROVACE™ 9900 VA Binder (65 VA/33.7 BA, with a calculated $T_g$=6° C., PS=250 nm). The latexes are combined at a 50:50 ratio based on the weight of the solids on the latexes. (The percent solids of the VA latex was 55% and the percent solids of the acrylic latex was 50%.

The grind was prepared using a high speed disperser. The letdown stage was carried out using an overhead stirrer by adding ingredients to the grind. In Table 1, 165 A Dispersant refers to TAMOL™ 165A Dispersant; 15-S-9 Surfactant refers to TERGITOL™ 15-S-9 Surfactant; SG-10AF refers to RHOPLEX™ SG-10AF Binder; 9900 Latex refers to ROVACE™ 9900 Latex, which was used as the VA based latex in all example and comparative example paints; RM-2020 refers to ACRYSOL™ RM-2020 NPR Rheology Modifier; RM-75 refers to ACRYSOL™ RM-75 Rheology Modifier. (TAMOL, TERGITOL, ROVACE, RHOPLEX, and ACRYSOL, are all Trademarks of Dow, Inc. or its Affiliates.)

| Ingredient | Comp. Ex 1 (27.5 PVC) (g) | Comp. Ex 2 (50 PVC) (g) |
|---|---|---|
| Water | 75.0 | 91.7 |
| 165A Dispersant | 13.3 | 21.9 |
| 15-S-9 Surfactant | 2.0 | 2.0 |
| BYK-022 Defoamer | 2.0 | 2.0 |
| AMP-95 Neutralizer | 1.0 | 1.0 |
| Ti-Pure R-706 Pigment | 164.9 | 164.9 |
| Minex 4 Extender | 120.0 | 306.2 |
| Water | 50.0 | 33.3 |
| 9900 Latex | 238.7 | 164.6 |

-continued

| Ingredient | Comp. Ex 1 (27.5 PVC) (g) | Comp. Ex 2 (50 PVC) (g) |
|---|---|---|
| SG-10AF | 262.5 | 181.1 |
| BYK-024 Defoamer | 2.0 | 2.0 |
| Texanol Coalescing Agent | 21.0 | 14.5 |
| Ammonia (28% aq.) | 0.3 | 0.3 |
| RM-2020 | 26.2 | 26.2 |
| RM-725 | 9.0 | 9.0 |
| Water | 76.9 | 149.9 |
| Totals | 1064.9 | 1170.7 |

Scrub Resistance

Paints were draw down over Black Leneta vinyl charts using a 7-mil Dow application bar in duplicate and dried at 25° C., 50% relative humidity for 7 d. After drying, each chart was cut in half lengthwise to produce four test strips for each coating. Scrub medium was prepared by thoroughly mixing Leneta Standardized Abrasive Type Scrub Medium SC-2 (636 g), water (318 g), and Airex 901W defoamer (1.5 g). The scrub tests were performed on a machine equipped with Masterflex L/S tubing pump, a metal tray with a 0.5"×10-mil brass shim, and nylon bristle brush. Each strip was placed on the metal tray over the shim with coated side up and secured with clamps. Scrub medium (10 g) was dispensed on the coating and the test was started with the counter set at zero. After each 400 cycles (before failure) an additional amount scrub medium (10 g) was dispensed before the test was continued. Scrub resistance was reported as the number of cycles needed to remove the coating fully in one continuous line across the 0.5" width of the shim. The mean values and standard deviations of the scrub cycles for the coatings were reported based on eight measurements per coating.

Table 2 illustrates the impact on scrub resistance arising from replacing BA with EA in the preparation of the acrylic latex.

TABLE 2

Scrub Cycle Data for Various VA/Acrylic Latex Paint Formulations

| Int. Ex. # | Paint Ex. # | VA:Acrylic (w/w) | PVC (%) | Scrub Cycles |
|---|---|---|---|---|
| 1 | 1 | 50:50 | 27.5 | 1490 |
| Comp. 1 | Comp. 1 | 50:50 | 27.5 | 1052 |
| 2 | 2 | 50:50 | 50 | 1063 |
| Comp. 1 | Comp. 2 | 50:50 | 50 | 820 |
| 2 | 3 | 75:25 | 50 | 1402 |
| Comp. 1 | Comp. 3 | 75:25 | 50 | 1071 |
| 3 | 4 | 50:50 | 50 | 1268 |
| Comp. 2 | Comp. 4 | 50:50 | 50 | 981 |
| 4 | 5 | 50:50 | 50 | 1117 |
| Comp. 3 | Comp. 5 | 50:50 | 50 | 862 |

The data illustrate that scrub resistance is significantly enhanced by the replacement of BA with EA in the preparation of the acrylic latex. This improvement is observed to be independent of the relative amounts of VA and acrylic binder particles (Paint Ex. 2 and 3), and PVC (Paint Ex. 1 and 2), and is also seen where the acrylic latex particles are further functionalized with PEM (Paint Ex. 5), which improves hiding. Thus, the properties of paints containing VA and MMA/EA based binders are improved overall as compared to paints containing VA and MMA/BA based binders.

The invention claimed is:

1. A composition comprising an aqueous dispersion of first polymer particles and second polymer particles, wherein the first polymer particles comprise from 60 to 99.8 weight percent structural units of vinyl acetate, based on the weight of the first polymer particles, and the second polymer particles comprise at least 80 weight percent, based on the weight of the second polymer particles, of structural units of ethyl acrylate and methyl methacrylate, wherein the weight-to-weight ratio of structural units of ethyl acrylate to methyl methacrylate in the second polymer particles is in the range of from 50:50 to 95:5; and wherein the weight-to-weight ratio of the first polymer particles to the second polymer particles is in the range of from 30:70 to 90:10.

2. The composition of claim 1 wherein the first polymer particles further comprise from 10 to 38 weight percent, based on the weight of the first polymer particles, structural units of an acrylate which is butyl acrylate, ethyl acrylate, or 2-ethylhexyl acrylate; and from 0.2 to 5 weight percent of an acid monomer which is a carboxylic acid monomer, or a phosphorus acid monomer, or a sulfur acid monomer, or a salt thereof.

3. The composition of claim 2 wherein the second polymer particles have a calculated $T_g$ in the range of from −10° C. to 30° C., and wherein the second polymer particles comprise from 0.1 to 3 weight percent structural units of an acid monomer which is a carboxylic acid monomer, or a phosphorus acid monomer, or a sulfur acid monomer, or a salt thereof.

4. The composition of claim 3 wherein the ratio of structural units of ethyl acrylate to methyl methacrylate in the second polymer particles is in the range of from 60:40 to 85:15, based on the weight of the second polymer particles, and wherein the second polymer particles comprise at least 90 weight percent, based on the weight of the second polymer particles, of structural units of ethyl acrylate, and methyl methacrylate.

5. The composition of claim 4 wherein the second polymer particles comprise less than 1.9 weight percent structural units of acrylonitrile, based on the weight of the second polymer particles.

6. The composition of claim 3 wherein the volume average particle size of the first polymer particles, as measured by dynamic light scattering, is in the range of 200 nm to 400 nm; and wherein the volume average particle size of the second polymer particles, as measured by dynamic light scattering, is in the range of from 70 nm to 150 nm.

7. The composition of claim 3, wherein the acid monomer is phosphoethyl methacrylate or methacrylic acid or salts thereof, or phosphoethyl methacrylate and methacrylic acid or salts thereof.

8. The composition of claim 1 which further comprises a dispersant, a surfactant, a defoamer, a neutralizer, a pigment, an extender, a coalescent, and a rheology modifier.

9. The composition of claim 8 which has a pigment volume concentration in the range of from 40% to 70%.

10. A composition comprising an aqueous dispersion of first polymer particles and second polymer particles, wherein the first polymer particles comprise, based on the weight of the first polymer particles, from 60 to 99.8 weight percent structural units of vinyl acetate and from 10 to 40 weight percent structural units of an alkyl acrylate; and the second polymer particles comprise at least 80 weight percent, based on the weight of the second polymer particles, of structural units of ethyl acrylate and methyl methacrylate, wherein the weight-to-weight ratio of structural units of ethyl acrylate to methyl methacrylate in the second polymer particles is in the range of from 50:50 to 95:5; and wherein the weight-to-weight ratio of the first polymer particles to the second polymer particles is in the range of from 30:70 to 90:10.

11. The composition of claim 10 wherein the structural units of the alkyl acrylate are structural units of butyl acrylate, ethyl acrylate, or 2-ethylhexyl acrylate.

12. The composition of claim 11 wherein the first polymer particles further comprise from 0.2 to 5 weight percent of an acid monomer which is a carboxylic acid monomer, or a phosphorus acid monomer, or a sulfur acid monomer, or a salt thereof.

13. The composition of claim 12 wherein the ratio of structural units of ethyl acrylate to methyl methacrylate in the second polymer particles is in the range of from 60:40 to 85:15, based on the weight of the second polymer particles, and wherein the second polymer particles comprise at least 90 weight percent, based on the weight of the second polymer particles, of structural units of ethyl acrylate and methyl methacrylate, and from 0.1 to 3 weight percent structural units of an acid monomer which is a carboxylic acid monomer, or a phosphorus acid monomer, or a sulfur acid monomer, or a salt thereof.

14. The composition of claim 13 wherein the volume average particle size of the first polymer particles, as measured by dynamic light scattering, is in the range of 200 nm to 400 nm; and wherein the volume average particle size of the second polymer particles, as measured by dynamic light scattering, is in the range of from 70 nm to 150 nm.

15. The composition of claim 14 which further comprises a dispersant, a surfactant, a defoamer, a neutralizer, a pigment, an extender, a coalescent, and a rheology modifier.

16. The composition of claim 15 which has a pigment volume concentration in the range of from 40% to 70%.

* * * * *